United States Patent [19]
Cermak et al.

[11] 3,803,896
[45] Apr. 16, 1974

[54] METHOD AND APPARATUS FOR FORMING LOCKING SURFACES ON GEAR RINGS

[75] Inventors: Milan Cermak; Vlastimil Fin; Frantisek Nepodal, all of Prague, Czechoslovakia

[73] Assignee: Praga, automobilove zavody, narodni podnik, Prague, Czechoslovakia

[22] Filed: May 19, 1972

[21] Appl. No.: 254,892

[52] U.S. Cl. .............................. 72/355, 29/159.2
[51] Int. Cl. .................................... B21k 1/30
[58] Field of Search .............. 72/355, 344–346, 72/393; 29/159.2

[56] References Cited
UNITED STATES PATENTS

| | | | |
|---|---|---|---|
| 1,625,131 | 4/1927 | Miller | 72/355 |
| 373,855 | 11/1887 | Rung | 72/355 |
| 601,082 | 3/1898 | Potter | 72/355 |
| 1,997,323 | 4/1935 | Strnad | 72/355 |
| 2,828,538 | 4/1958 | Darden | 72/355 |
| 2,122,044 | 6/1938 | Powell | 72/393 |
| 1,274,359 | 7/1918 | Limont | 72/348 |
| 3,563,082 | 2/1971 | Zapf | 72/374 |

*Primary Examiner*—Richard J. Herbst
*Attorney, Agent, or Firm*—Murray Schaffer

[57] ABSTRACT

The method of forming ring gears comprising the steps of locating a preformed internal gear ring workpiece between a fixed circumferential bearing ring and a plurality of movable segments, each of the segments having a tooth die face on which the desired interlocking bevel or shape is formed. The segments are thereafter shifted in a horizontal plane, into the gear ring with a degree of force sufficient to cold press and form the teeth of the ring with a correspondingly desired interlocking surfaces.

3 Claims, 4 Drawing Figures

METHOD AND APPARATUS FOR FORMING LOCKING SURFACES ON GEAR RINGS

BACKGROUND OF INVENTION

The present invention relates to a method and apparatus for finishing internal gear rings, such as shift sleeves for automotive and similar transmissions, and in particular to provide gear rings with internal teeth having interlocking surfaces which prevent slackening or loosening of the intermeshed transmission.

One of the problems in providing suitable transmissions is to avoid the spontaneous release, slackening or loosening of the shiftable gear sleeves or gear rings during extended operation. Various modications and forms of gear rings have been attempted to obviate this so called "gear engagement slackening". Generally this is accomplished by attenuation of the gear teeth in the direction inwardly of the sleeve. A protracted bevelling or special shaping of the teeth is made enabling the teeth to engage in a secure and solid interlocking. This bevelling or shaping is generally made by machining operations, as by underplaning. Special machines and special machining operations are therefore required. The cost and time expended in production is long and the operation itself is troublesome.

It is an object of the present invention to provide a method and apparatus for finishing internal gear rings such as shift sleeves in which the difficulties and disadvantages of the prior art are overcome.

It is another object of the present invention to provide for the finishing of internal gear teeth with bevels and shaping creating interlocking surfaces by a simple and inexpensive process, namely the cold forming or pressing of such surfaces.

It is a further object to provide simple and economical tools for the cold forming of internal gear rings.

These objects, as well as others and numerous advantages will be seen from the following disclosure of the present invention.

SUMMARY OF INVENTION

According to the present invention the method comprises the steps of locating a preformed internal gear ring workpiece between a fixed circumferential bearing ring and a plurality of movable segments, each of the segments having a tooth die face on which the desired interlocking bevel or shape is formed. The segments are thereafter shifted in a horizontal plane, into the gear ring with a degree of force sufficient to cold press and form the teeth of the ring with correspondingly desired interlocking surfaces.

The device of the present invention comprises a central conical mandrel which is activated by a hammer or press member. The mandrel is centered within an annular forming jaw having a plurality of segments which are shifted by the mandrel. The jaw rests on a smooth bearing plate and is spaced from an annular bearing ring fixed to a base. The space between the jaws and the bearing ring receives the internal gear ring which itself rests on an elevator ring. The elevator ring serves not only to support but also to eject the gear ring when the process is finished.

Preferably, the segments form an annular ring held together by a circular spiral helical spring.

Full details of the present invention will be seen from the following description and the accompanying drawings.

DESCRIPTION OF INVENTION

Figure 1:
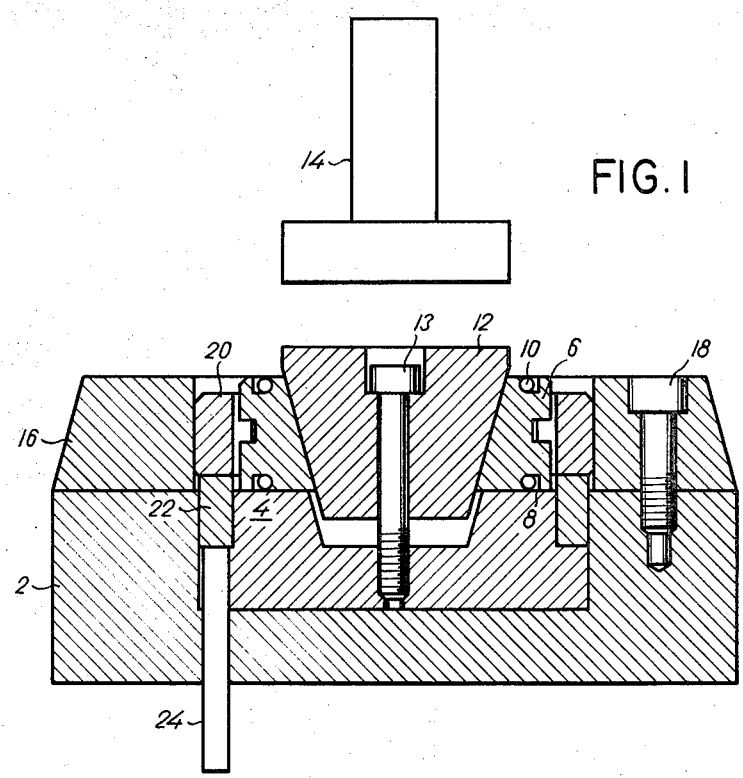
FIG. 1 is a vertical section through the present apparatus, in schematic form showing the present method and apparatus.
Figure 4:
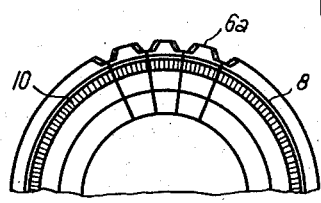
FIG. 4 is a partial plan view of the forming jaw.

The method and apparatus of the present invention are best illustrated by reference simultaneously to the embodiment seen in FIGS. 1 and 4. The mechanism for forming the internal tooth shape of the shift sleeve comprises a base plate 2 having a central depression or opening on which is situated a bearing plate 4 having a smooth flat upper surface. Located on the bearing plate 4 about the central opening are a plurality of forming jaw segments 6. The forming jaw segments are wedged shaped members having tooth like projections 6a on their outer circumferential faces which form the tool die surfaces. The segments 6 are arranged in a unitary annulus and are each provided with a groove 8 on their upper and lower flat faces which combine to form a common circular groove in which is retained a spiral helical ring coil spring 10. The springs 10 draw the segments 6 radially together to form an expandable jaw member. The jaw segments 6 are adapted to normally press, being biased by the spring 10 against and to be expanded by the downward movement of the truncated conical mandrel 12. The mandrel 12 is held loosely about a central pin 13 and is moved by the application of a downward force exerted by a hammer 14. The hammer 14 may be the ram of a conventional machine press, trip hammer or hydraulic ram.

Spaced from the circumference of the forming jaws 6 is a radial bearing ring 16 which is securely fixed to the base plate 2 by screws, bolts or other suitable fastening means 18. The outer bearing ring 16 is spaced from the jaws 6 sufficiently to provide an annular space in which a preformed unfinished workpiece such as a gear ring or shift sleeve 20 may be inserted. The workpiece rests on an ejector ring 22 which is elevatable by one or more ejector pins 24, manually or automatically operated.

In operation, a preformed semi-finished workpiece, such as a shift sleeve or internal ring gear having a series of teeth formed on its inner surface, is placed on the ejector ring 22 and the hammer 14 is activated by a substantial downward force calculated to move the mandrel 12 to spread the jaws 6 apart. The spreading jaw segments 6a press into the inner edge surface of the workpiece. The jaws 6 shift radially and are automatically adjusted into the tooth spaces of the semi-finished workpiece and provide the finishing operation providing the necessary interlocking lands. On the completion of one or more of the downward strokes of the hammer 14, the workpiece is completely cold pressed or formed with the desired locking means and interengaging tooth portions. On obtaining the desire results the hammer is withdrawn and the mandrel forced upward by the contraction of the jaws by the spring. The workpiece is then released and ejected.

The forming jaw segments 6 can be individually formed or the entire annular jaw 6 can be formed as a complete member on conventional gear teeth grinding machines. The teeth can thus be formed with the properly shaped teeth corresponding to the desired gear system, as well as with the adjustable form for the creation of the desired interlocking and interengaging portions. Preferably the forming jaws 6 are first made as a solid ring gear having external teeth the converse of the workpiece, after which it is cut into their several segmented shapes polished and clamped together by the spiral helical spring.

According to the present invention many different forms and varities of teeth shapes having interlocking and interengaging surfaces can be made. Several such shapes are seen in FIGS. 3a to 3d. Preferably, the interlocking surfaces are formed with a flaring or outwardly larger end, illustrated in FIG. 3. During the pressing operation described, the superfluous material is pressed out in the root of the gear tooth of the workpiece and in the tooth top. A low profiled fix is created in the root of the tooth. The root clearance must be increased by the dimension of the low profiled fin.

Figure 3A:
FIG. 3 is a series of illustrations (a) to (d) showing various interlocking bevels and shapes.
Figure 3B:
Figure 2:
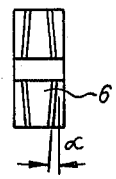
FIG. 2 is a view on the forming jaw segment the die face of which is an approximate negative of the cold formed interlocking surface.

The shape of the bevelled interlocking surface FIG. 3a, b is made by the means of the negative form of the die face forming jaw segment 6 FIG. 2 having a bevel angle α, where the bevelling of the tooth specifies the shape of the interlocking surface on the workpiece.

Figure 3C:
Figure 3D:

At other forms of the interlocking surfaces, such as FIG. 3c, d and similar, the form of the die faces of the forming jaw segment is the negative of the interlocking surfaces desired.

The significant advantage of the present invention lies in the fact that the bevel or shape of the interlocking mechanism on the shift sleeve is formed by the simple and economical cold forming or pressing operation, between an expandable jaw and mandrel are efficient, simple, very strong and durable. The circular coil spring is simple but effective in providing a normal bias to the jaw which facilitates removal of the workpiece and the mandrel at the end of a work cycle. As a result of the present process, rapid and increased productivity is obtained. Furthermore, all the teeth of the workpiece are formed and finished at once, and with the same stroke and force applied. The resultant product is therefore cheaper yet improved over the prior products.

Many changes and modifications are possible and it is intended that the present disclosure be illustrative only and not limiting of the scope of the present invention.

What is claimed:

1. Apparatus for finishing the shape of preformed internal gear rings such as shift sleeves with interlocking surfaces comprising a base having a flat supporting surface, a circumferential bearing ring having a cylindrical bore fixedly mounted on said base, a plurality of die segments arranged in an annulus within said bearing ring and movably supported on said flat surface of said base, each of said segments having die means on their outer circumference being the negative of the desired interlocking surface of said teeth, the diameter of said annulus being less than said bearing ring providing a space for entry of said gear ring therebetween, means for supporting said gear ring in axial fixed position with respect to said die segments, mandrel means axially movable with said annulus shifting said segments radially on said flat surface to press said segments outwardly into said gear ring under sufficient pressure to cause said die faces to cold form the interlocking surface of said teeth of said gear ring.

2. The apparatus according to claim 1 wherein each of said segments have a cut on at least one axial face, cooperatively forming a common annular groove, a spiral helical spring located within each of said common grooves to bias said segments radially inward into a unitary jaw member the die means extending over the entire circumferential face of each segment.

3. The apparatus according to claim 1 wherein said base includes elevator means located between said annular jaw and said fixed bearing ring for supporting said gear ring during operation of said segments and for ejection of said finished gear ring.

* * * * *